United States Patent
Rossi et al.

(10) Patent No.: US 6,778,522 B1
(45) Date of Patent: Aug. 17, 2004

(54) BANDWIDTH OPTIMIZER DYNAMICALLY OPERATING IN CONNECTIONS RELATING TO RADIOCOMMUNICATIONS, PARTICULARLY FOR DECT SYSTEMS

(75) Inventors: Patrizia Rossi, Rome (IT); Luigi D'Antonio, Rome (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 633 days.

(21) Appl. No.: 09/599,457

(22) Filed: Jun. 22, 2000

(30) Foreign Application Priority Data

Jun. 23, 1999 (EP) ............................................ 99830393

(51) Int. Cl.[7] .................................................. H04J 3/24
(52) U.S. Cl. ........................ 370/349; 370/431; 370/464; 370/913
(58) Field of Search ................................. 370/310, 345, 370/349, 431, 464, 913; 714/704, 748

(56) References Cited

U.S. PATENT DOCUMENTS

| | | | |
|---|---|---|---|
| 5,537,416 A | * | 7/1996 | MacDonald et al. .......... 371/32 |
| 6,452,915 B1 | * | 9/2002 | Jorgensen ................... 370/338 |

FOREIGN PATENT DOCUMENTS

| | | |
|---|---|---|
| EP | 0 836 291 A | 4/1998 |
| WO | 97/31495 | 8/1997 |
| WO | 98/03030 | 1/1998 |

OTHER PUBLICATIONS

Chang et al, "Multichannel ARQ Protocols", IEEE Transactions on Communications, vol. 41, No. 4, Apr. 1993, pp. 592–598.

* cited by examiner

Primary Examiner—Hassan Kizou
Assistant Examiner—Joe Logsdon
(74) Attorney, Agent, or Firm—Nixon & Vanderhye, P.C.

(57) ABSTRACT

This invention refers to a bandwidth optimizer, dynamically operating in connections relating to radio-communications for multi-bearer systems, especially useful for DECT systems for the short-distance transfer of data packets. Such an optimizer comprises: a first block to which bit error rate (BER) is fed and which calculates the most likely number (k) of retransmissions, which is required by the quality of air interface; a second block, which receives from the first one the most likely number (k) of retransmissions and provides, on the basis of such a number, a table giving the change in transmission time with the number of bearers; and a third block, which is fed by the second one and decides the optimal number of bearers to be allocated to the connection and the output of which feeds a device for resources allocation (RA), the optimal number of bearers representing the maximum band to allocate to the connection, depending also on the traffic intensity.

5 Claims, 5 Drawing Sheets

BANDWIDTH OPTIMIZER DYNAMICALLY OPERATING IN CONNECTIONS RELATING TO RADIOCOMMUNICATIONS, PARTICULARLY FOR DECT SYSTEMS

FIELD OF THE INVENTION

This invention refers to a bandwidth optimiser, dynamically operating in connections to multi-bearer systems for radio communications, especially useful in the so-called DECT systems for the transfer of data packets for short distances. The bandwidth optimizer according to the invention does not concern, however, only said implementation. It can be in fact useful also in UMTS systems.

More particularly, the bandwidth optimiser according to the invention is applicable in the field of the radio access. It can be applied to each fixed system that provides the transmission of packets using Digital Enhanced Cordless. Telecommunications (DECT) technology with data service profiles allowing multi-bearer connections (e.g. B1 and subsequent)

As it is well-known, DECT—standardised according to ETSI rules ETS 300 175 (1–9), second edition 1996—is based on a micro and pico-cellular radio communication system that provides low-power radio (cordless) access between portable parts (PPs) and fixed parts (FPs) at ranges of few kilometres, allowing transmission of voice and data. Thus the DECT radio access network is a radio based access network, enabling connection of subscribers without conventional wiring between local exchange and subscriber's house. It is suitable both for urban and suburban areas with densities of 10 to 50,000 subscribers per $km^2$.

STATE OF ART AND RELATED PROBLEMS

It is advisable to consider the present state of art in the field of the present invention.

Consider that DECT uses a multi-channel, time-division multiple access, time-division duplex (MC-TDMA/TDD) radio interface and operates in the range 1.88–1.9 GHz. The radio bandwidth is split into ten channels in the frequency domain. Each of these ten channels is divided, in turn, in the time domain into a cycle of 2×12 repeating (duplex) time slots. The time slots may have either a protected format, through the Cyclic Redundancy Codes (CRCs) or not.

The first application of DECT regarded only voice transmission, but DECT has proven a very flexible system which can find other uses: particularly it includes the so-called Data Service Profiles (DSPs) that make it suitable to all current applications of data transmission, such as colour fax, e-mail, file transfer, group ¾ fax, real-time video, video messaging and so on.

Nowadays, the greatest interest is towards the Internet access both for data transmission and for applications such as voice over IP and Home Working for the remote access to a corporate Intranet.

These applications require strong constraints on the quality of transmission, so that a DECT system necessitates sending data with a low error percentage (the optimum obviously being 0). For this purpose the need to have a protected format for the time slots, retransmissions or, in the most delay sensitive cases, Forward Error Correction (FEC) is stronger in data than in voice transmission, obviously to the detriment of the introduced delay that in turn effects the performance of the system (for instance in terms of effects on TCP/IP).

Thus, in the current implementations utilising DECT, the error correction service on the Medium Access Control (MAC) of the DECT protocol stack is implemented so as to allow the time slots to have a protected structure, which is guaranteed by the CRCs, a mechanism to detect errors. Every time an error is detected the whole slot is retransmitted.

A structured analysis that provides estimation about the error probability of slot and Service Data Units (SDUs) with respect to the bit error rate, independent of application in order to evaluate the performances of a DECT system in terms of delay, is missing in the literature and in the state of the art. Only some evaluations about the voice service can be found, but in this case the overall number of test bits is for example 84, in particular 84 bit per full slot of 420 bits.

The inventors calculated the error probability of the time slot and of the related SDUs with or without retransmission and showed how these probabilities change with respect to the bit error rate. Furthermore, they carried out an analysis of the probability for a certain number of retransmissions and the delay to occur, as a function also of the number of bearers (carrier/time-slot combinations) used in the connection.

This strategy of analysis developed in the above mentioned framework—which is absolutely new for such a framework, also for the mathematical approach employed—has importance not only because it is applicable for systems that use a DECT profile with protected format for the time slots, with or without retransmissions, independently of the application, but also because it allows to deploy the system in the best way according to the quality of the air interface. In fact, it is possible to assign to each connection a suitable value for the bandwidth with respect to bit error rate. So, a system of bandwidth optimisation has been designed, which has bit error rate as input and takes into account the traffic load. Such a system is absolutely new, since it was never used and no trace is found in the literature.

SUMMARY OF THE INVENTION

Starting from the analysis above, this invention more specifically refers to a bandwidth optimiser, dynamically operating in connections in radio communications to multi-bearer systems, especially useful in DECT systems for the short-distance transfer of data packets and it is characterised in that comprises: a first block, to which bit error rate is fed and which calculates the most likely number of re-transmissions required by the quality of air interface; a second block which receives from the first one said number of retransmissions and provides, on the basis of such a number, a table giving the change in transmission time with in the number of bearers; and a third block, which is fed by the second one and decides the optimal number of bearers to be allocated to the connection and the output of which feeds a device (RA) for resources allocation, said optimal number of bearers representing the maximum band to be allocated to the connection, depending also on the traffic intensity.

In this optimiser, the first block considerates bit error rate (BER) during each connection as a constant, which is calculated during the previous connection and calculates the most likely number of retransmissions, which are necessary for a correct transmission as sum of the probability of error in N time slots upon changes in the bit error rate, while the second block calculates time to transmit a unit of service data, plus delay due to the retransmissions, also connected with the number of bearers, and the third block determines the optimal number of bearers to be. allocated, taking into account traffic intensity, thus delays, as well as the quality of interface air.

BRIEF DESCRIPTION OF THE DRAWINGS

The invention is now disclosed more in depth in the following, referring to the figures and schemes of the annexed drawings, wherein.

DESCRIPTION OF AN EMBODIMENT OF THE INVENTION

Figure 1:
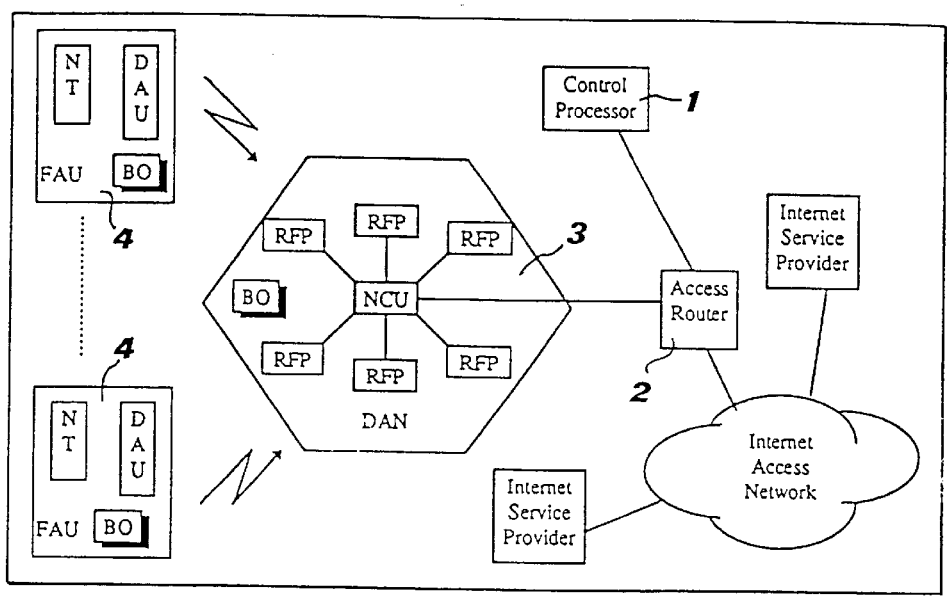
FIG. 1 schematically shows the example of a system for IP packet transport on a DECT interface, wherein the bandwidth optimiser of this invention may play an important role.

With reference to the drawings, FIG. 1 schematically shows—as it was mentioned above—an example of a system in which the bandwidth optimiser BO according to the invention plays an important role, whereby the illustrated system performs the transport of IP packets on a DECT interface.

According to the scheme of FIG. 1, the control processor 1 provides functions devoted to the system network management; the access router 2 (AR) routes data between the system network and the Internet; DECT access node (DAN) 3 or external antenna is in charge of routing data between the access router (AR) 2 and, via DECT air interface, the associated fix apparatuses (FAUs) 4. The DECT access node 3 (DAN) is comprised by a node control unit (NCU), that controls the whole DAN activity and by six radio fixed parts (RFP), apt to enable communications with the FAUs 4. Each FAU 4 converts a DECT wireless connection from a RFP in a DAN, into a phone connection. Each FAU 4 is comprised by a DECT access unit (DAU), in charge of managing the radio communication with DAN and by a network terminal (NT) in charge of managing the radio communication with user's network. Each FAU 4 can access every RFP within a DAN 3.

According to the invention, a bandwidth optimiser (BO) is associated to each FAU.

Figure 2:
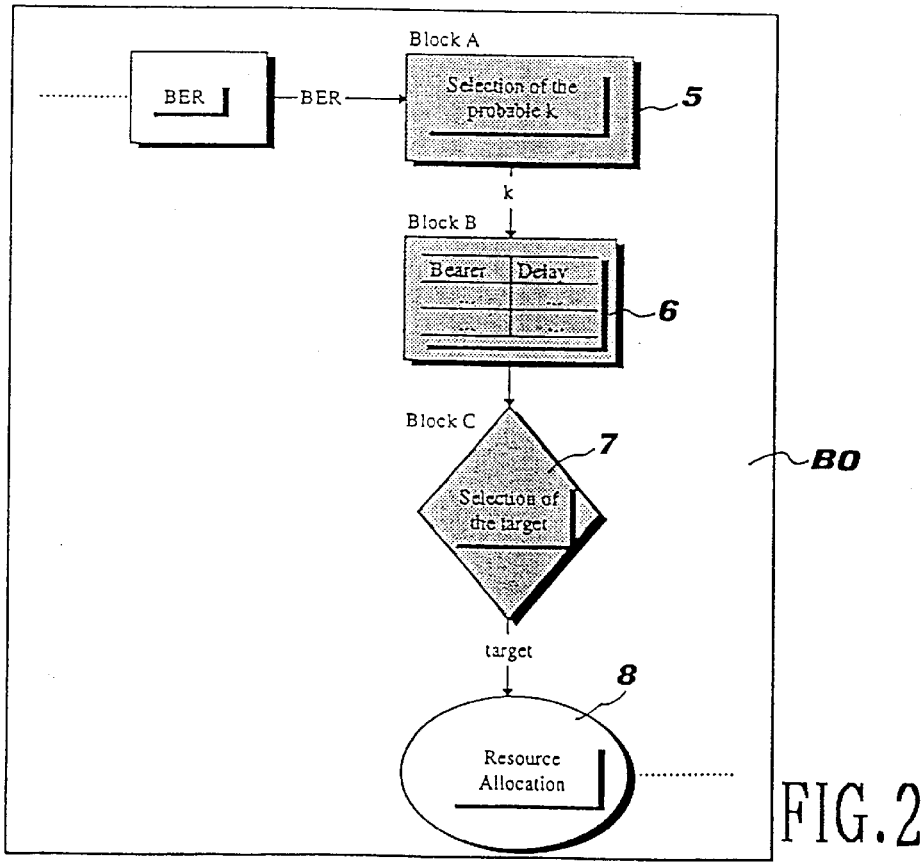
FIG. 2 is a block diagram of the configuration of the optimiser according to the invention.

The Bandwidth Optimiser (BO) comprises (FIG. 2) of three parts shown in the figure as shadowed blocks 5, 6 and 7.

The first block 5 is fed by bit error rate (BER), which is therefore its input. The output is the most probable number of retransmissions, k, relative to the actual situation (the quality of air interface). The number k can be a real or an integer value. If real, it is approximated to the nearest integer.

The second block 6—which is fed by the block 5—has k as input and computes a table based on that number, where for each bearer (or allocated bandwidth) the time of transmission including delay, is given.

The third block 7—fed by the block 6—is the most important one, being the decision maker: its output is indeed the optimal number of bearers to be allocated to the connection. This value, which is obtained also with respect to the intensity of the traffic, affects in 8 the resource allocation (RA) algorithm, so that the target of the connection, i.e. the maximum number of bearers, equals this value. In the following it is assumed that the target value is greater than 1.

Figure 3:
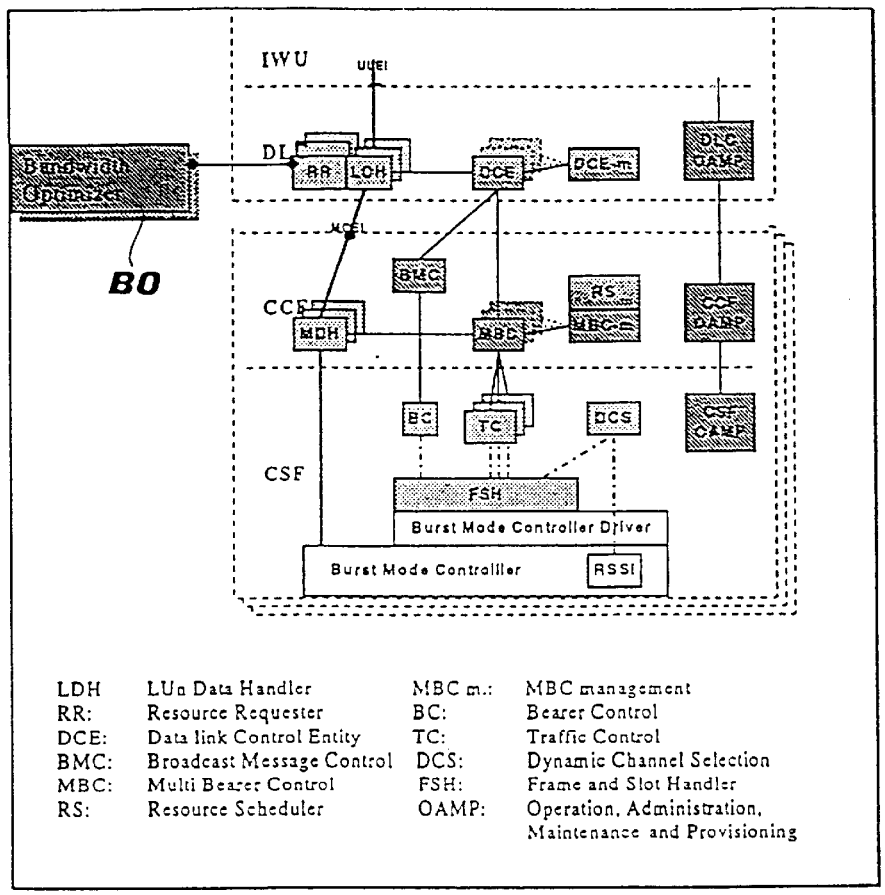
FIG. 3 is a block diagram illustrating the architecture according to which resource allocation and its interaction with the bandwidth optimiser according to the a invention.

Referring to the block diagram of FIG. 3—describing the architecture according to which the resource allocation (RA) is effected in charge of the resource management and its interaction with the bandwidth optimiser—it is to be taken into account that the functionality of the resource requester (RR) is required both in the DAN and FAU. In the DAN, for each permanent virtual connection (PVC), a resource requester RR is required, the functionality of RR and interfaces being the same for both FAU and DAN.

The RR functions are the following:
to reserve uplink bandwidth (RR in FAU);
to reserve downlink bandwidth (RR in DAN);
to determine minimum and target number of bearers at start of databurst (the target is determined by the bandwidth optimiser);
to determine bandwidth increase or decrease during connection as a result of changing traffic characteristics at TX buffer.

Also the functionality of resource scheduler (RS) is required both in DAN and FAU.

The RS functions in DAN are the following:
to maintain a list of number of free and engaged resources at RFP(s);
to allocate resources to uplink and downlink resource requests, taking into account resource occupation at RFP(s);
to queue downlink resource requests;
to provide fair access for uplink resources requests compared to queued downlink requests;
to reduce resources of existing connections (back-off), when possible, in order to serve new resource requests;
to increase resources of existing connections if new bandwidth becomes available at RFP (e.g. if other connections fail).

The RS functions in FAU are:
to store failed uplink resource requests;
to initiate re-attempt of resource request;
collision control of re-attempts.

Figure 4:
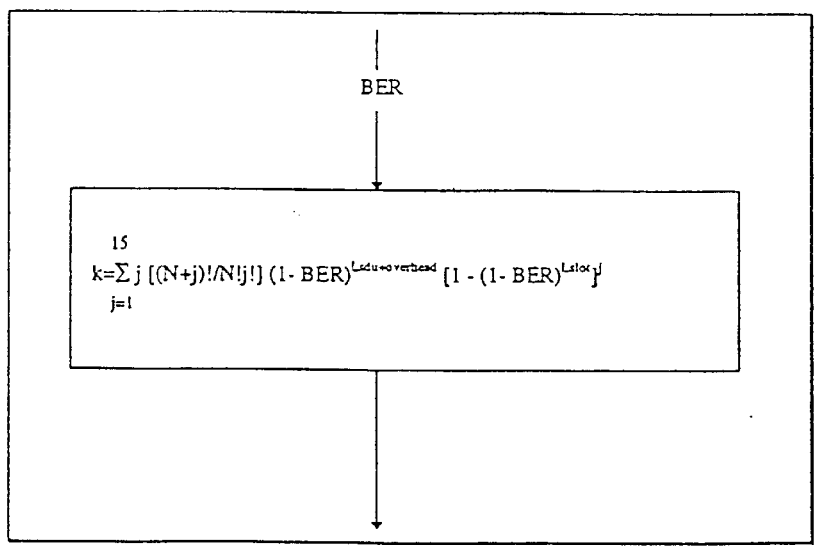
FIG. 4 schematically shows the block of the optimiser according to the invention, which calculates the most likely number of retransmissions depending on bit error rate.

As previously mentioned, FIG. 4 schematically shows the block of the inventive optimiser that computes the most probable number of retransmissions with respect to the bit error rate; the bit error is considered a constant parameter during a connection and its value is calculated during the previous connection.

The expression $$k = \sum_{j=1}^{15} j[(N+j)!/N!j!](1-BER)^{Lsdu+overhead}[1-(1-BER)^{Lslot}]j$$

gives the probability to have j re-transmissions when N slots are transmitted correctly, so N represents the number of slots that constitute the data unit (SDU). Furthermore $L_{sdu+overhead}$ is the number of bits belonging to the data unit (SDU) plus the overhead (due to the DECT protocol) and similarly $L_{slot}$ is the length of the slot. The index j, multiplied by the above expression represents the weight given to each probability. In fact, for a fixed value of BER each retransmission has a certain probability, $P_0$, $P_1$ . . . but each of them has a different weight, represented by j. The number k is obtained by the sum of every probability, multiplied by j.

Figure 5:
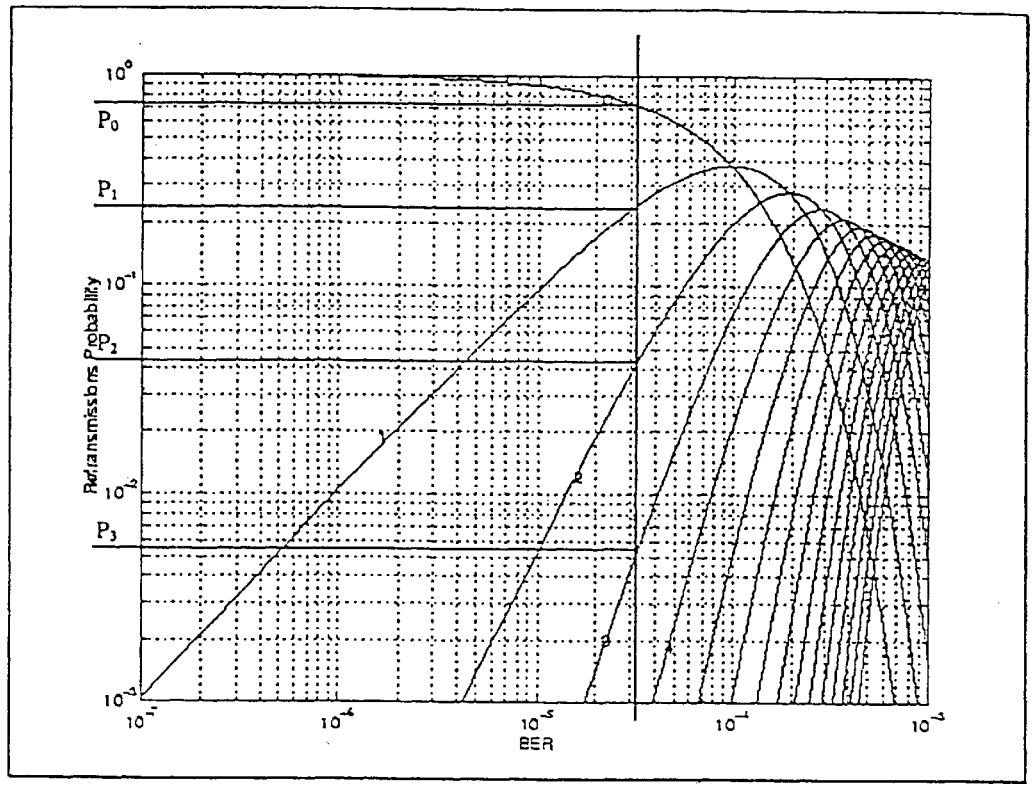
FIG. 5 is a diagram representing the probability of retransmission as a function of bit error rate.

FIG. 5 shows in a diagram the probabilities to have 0, 1, 2 . . . retransmissions with respect to the bit error rate: thus, each curve of such a diagram represents the probability to have a certain number of retransmissions as a function of the bit error rate. The graphs of FIG. 5 are computed setting N=22, that is assuming a SDU of 22 slots.

Figure 6:
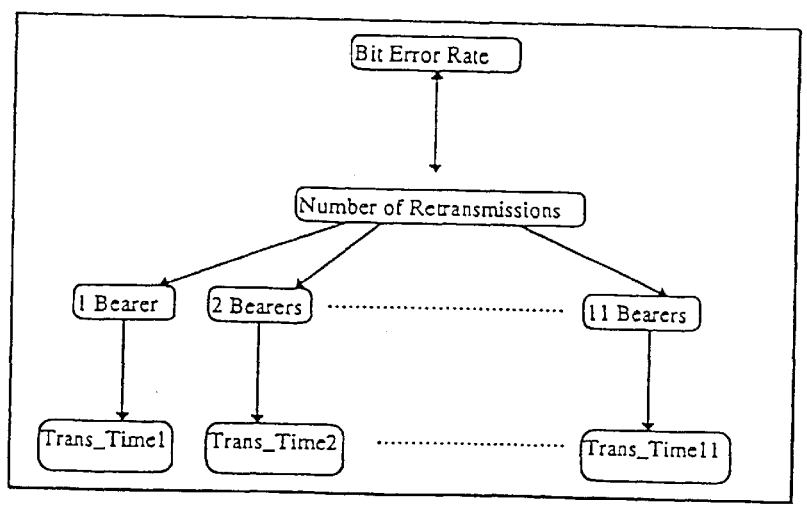
FIG. 6 is a scheme indicating the transmission time per each number of bearers.

The value of k obtained from block 5 and fed to block 6 is approximated to the nearest integer. This number allows to compute the time to transmit a data unit (SDU) plus the delay due to the retransmissions, with respect to the number of bearers allocated. The scheme of FIG. 6 represents the sequence followed hitherto and reports the transmission time for each number of bearers.

Figure 7:
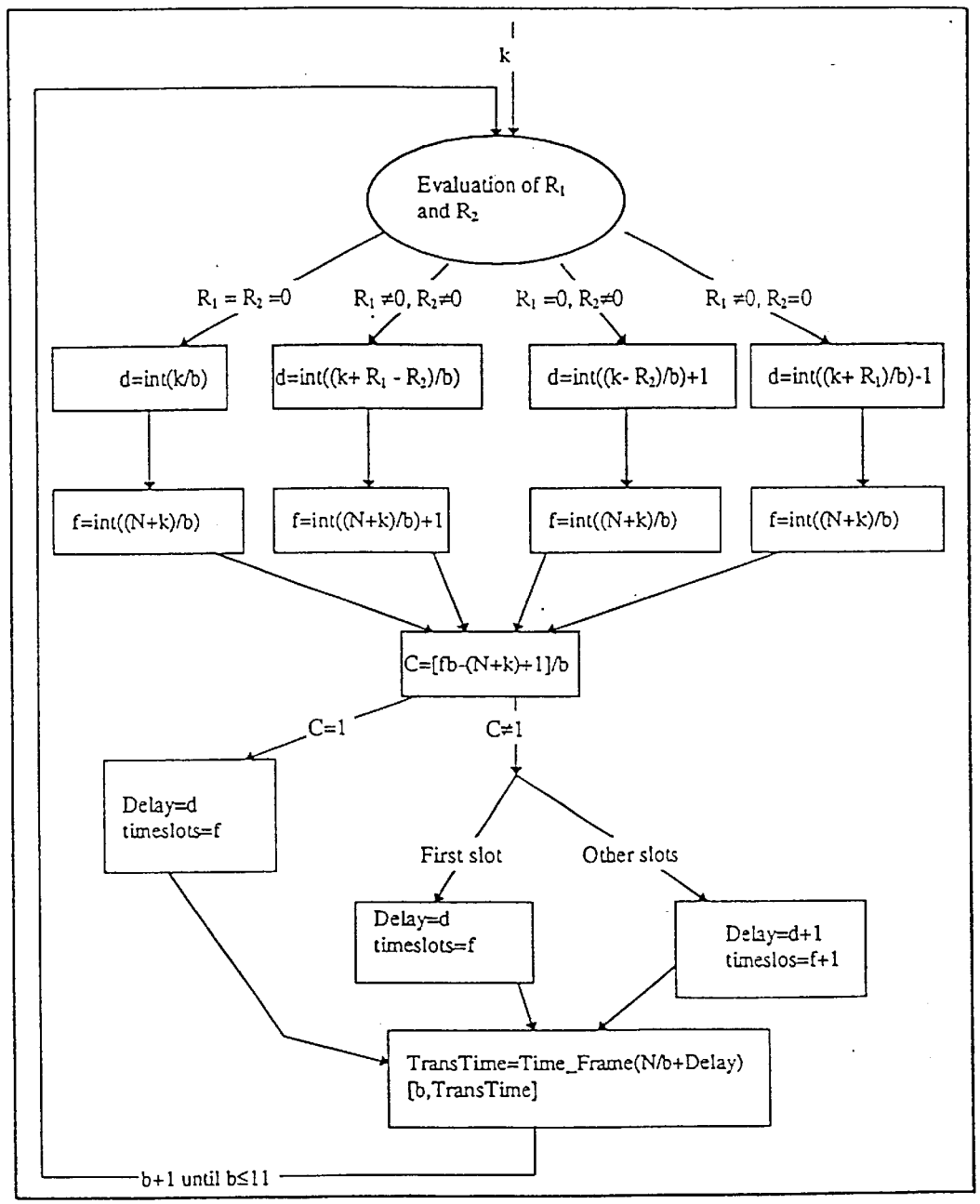
FIG. 7 is the presentation of the algorithm for evaluating the total transmission time with respect to the employed bearers.

When considering the algorithm for evaluating the total transmission time with respect to the bearers employed, which is represented in FIG. 7, it is to be taken into account that the coefficients $R_1$ and $R_2$ are the rests of division of N and of N+k respectively by b, where b represents the number of bearers. Coefficient f represents the number of time slots to transmit N+k slots (SDU plus retransmissions). The probability to have a certain delay is given by $CP_k$, where $P_k$ is the probability of k re-transmissions to occur.

It is worth noting that, in the presence of a multi-bearer connection it is not a priori known "where" SDU begins its transmission with respect to the connection, that is whether the first slot of a SDU is transmitted to the first bearer of a connection or not. The latter case may take place when a SDU is transmitted "immediately after" a previous one (using the same connection) the last slot of which has used not all bearers of said connection (i.e. when a few bearers were available for the first slot of the new SDU, so that slots of both SDU are present on the same frame).

As an example, a three-bearer connection and a SDU having 24 slots (SDU1) with two slots to be retransmitted can be considered. From the following table, it is possible to see that the transmission of SDU1 requires eight "complete" frames plus two bearers of frame 9, so that the subsequent SDU (SDU2) can begin to be transmitted in the frame 9 on the bearer 3 (and in such a case, also without re-transmissions), SDU2 will require at least (9×time frame) ms to be transmitted, that is a time frame more than the minimum possible with a three-bearer connection

|  | BEARER 1 | BEARER 2 | BEARER 3 |
|---|---|---|---|
| FRAME 1 | SDU1 | SDU1 | SDU1 |
| FRAME 2 | SDU1 | SDU1 | SDU1 |
| FRAME 3 | SDU1 | SDU1 | SDU1 |
| FRAME 4 | SDU1 | SDU1 | SDU1 |
| FRAME 5 | SDU1 | SDU1 | SDU1 |
| FRAME 6 | SDU1 | SDU1 | SDU1 |
| FRAME 7 | SDU1 | SDU1 | SDU1 |
| FRAME 8 | SDU1 | SDU1 | SDU1 |
| FRAME 9 | SDU1 | SDU1 | SDU2 |

So the algorithm takes into account also the fact whether the transmission of a SDU starts with the first time slot of the frame or with the other ones.

The block 7 of the inventive bandwidth optimiser is—as previously mentioned—the most important one, because its output is the input for the resource allocation (RA) algorithm. The purpose of this algorithm is to manage the bandwidth bearers of the connections with respect to the requests. For each connection a minimum and a maximum for the number of bearers are requested. If it is not possible to assign the number specified by the target, a small number of bearers but greater of equal than the minimum, is assigned.

In some cases (high or medium traffic situation) it is not convenient for the application to allocate a too large bandwidth, because the re-allocation of the bandwidth, in order to serve as much as possible requests, causes waste of bandwidth, i.e. further delays. On the other hand, in low traffic situations there is no reason to limit the bandwidth per connection, so the maximum (11 bearers) can be assigned.

Thus the object of the latest block 7 is to determine the suitable number of bearers (the target) taking into account, besides the quality of air interface, the traffic load and the delays as well.

Figure 8:
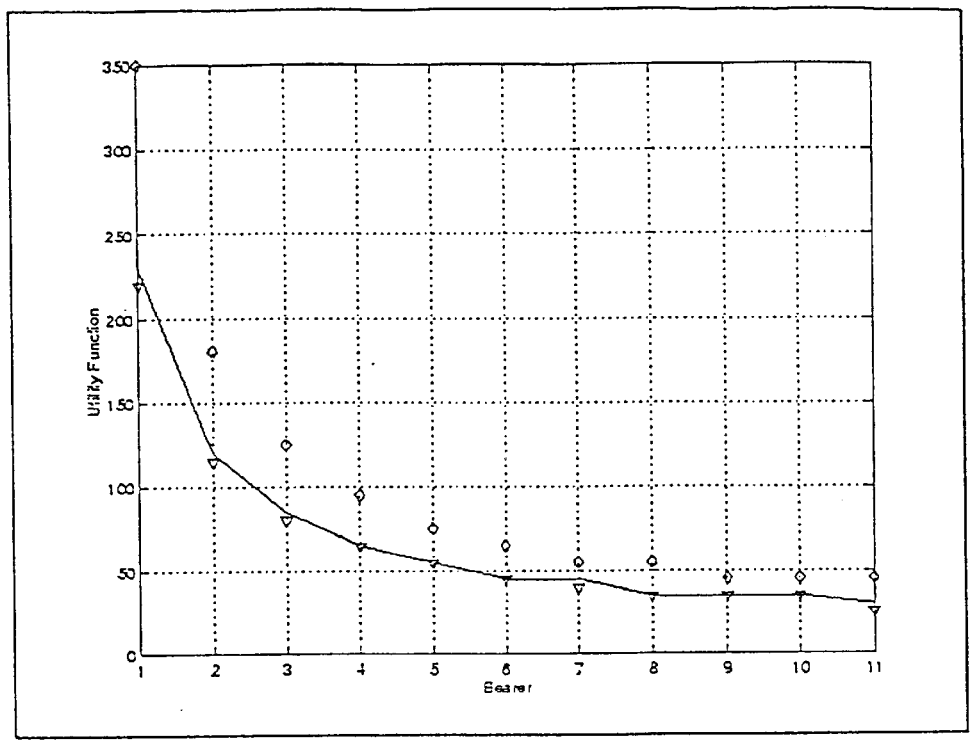
FIGS. 8 and 9 are diagrams comparing the function of "utility" with respect to the number of bearers, respectively in the case of conventional technique and in the case in which the present invention is used.

In fact, if one considers only the transmission delay as a decision criterion (which could be acceptable in a "low traffic" situation), the optimum will shift towards a high number of bearers, as it is depicted in the diagram of FIG. 8, where only the curves for BER values $10^{-7}$, $10^{-4}$ and $10^{-3}$ are represented, the x-axis representing the number of bearers and the y-axis the "utility" function, in this case just the transmission time.

In order to take into account the bandwidth utilised, the "utility" function (i.e. the one to be minimised) has been modified as follows, according to the invention:

TransTime*b

Where TransTime represents the transmission time (as usual including retransmissions), while b is the connection bandwidth.

Figure 9:
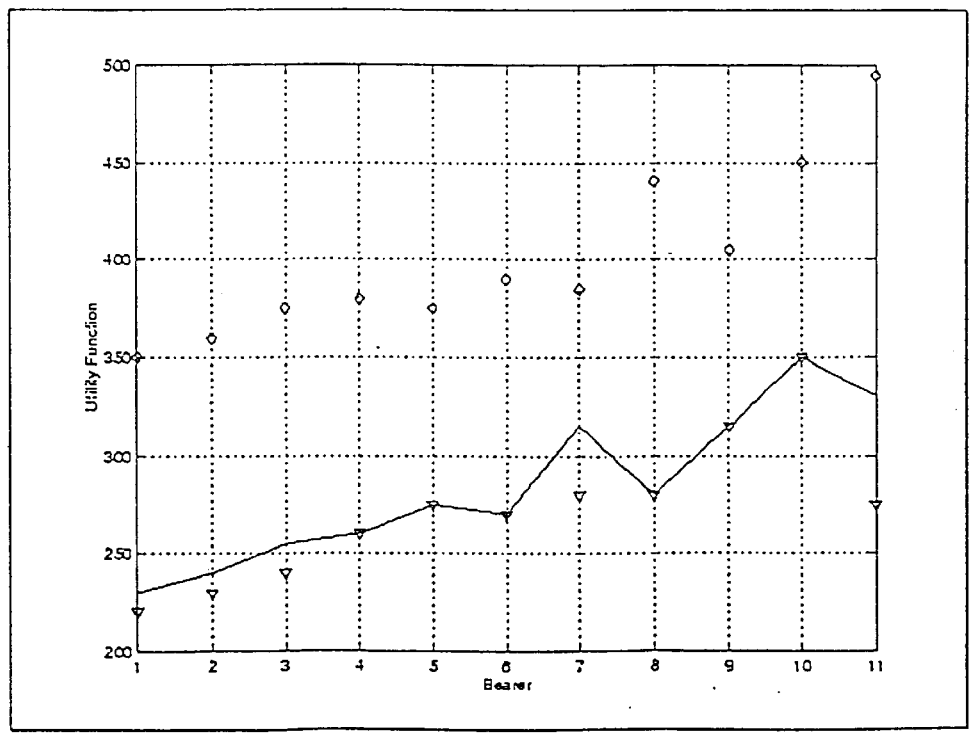

In this case, the system behaviour is depicted in the diagram of FIG. 9 which shows in particular the curves for BER=$10^{-7}$, BER=$10^{-4}$ and BER=$10^{-3}$.

According to the previous considerations, the system load (traffic intensity) must be carefully taken into account, in order to optimise the global bandwidth use. For this purpose three situations have been identified: A. low load; B. medium load; C. high load.

It is up to the NWK operator to define the policy of switching between the situations (e.g. simply according to time and day, or according to more sophisticated procedures).

With respect to the traffic load case, the decision maker will select the number of bearers which minimises the T*b product. Thus Case A: the system will allocate the maximum number of available bearers (up to 11);

Case B: the optimum has been found to be the second minimum (it is to be noted that all functions have the absolute minimum at one bearer) of the utility function; it is here to stress that this value maximises the capacity of the connection (see table);

Case C: whereas target>1, the chosen value will be the one which minimises the utility function for connections with a number of bearers between 2 and 4. This avoids delays due to frequent bandwidth re-allocations, which are expected to occur often in highly loaded systems (high traffic).

What is reported above shows that the inventive optimiser allows to dynamically and continuously determine the bandwidth to be allocated to the connections in radio-communications with multi-bearer systems, especially of DECT systems for short-distance transfer of data packets, in order to obtain a transmission as good as possible. Indeed:

- it allows to optimise the global capacity of the application driving in a smart way the behaviour of the resource allocation algorithm;
- it involves blocks 5 and 6 which are independent of the particular application and which give an important information for the network planning;
- it involves blocks 5 and 6 which work with respect to the bit error rate allowing in this way to employ the application with respect to the quality of the air interface (or in terms of C/i).
- it uses a straightforward and immediate algorithm;
- it can be extended to voice over IP (without the usual problems for delays which are negligible for data transmission, but which negatively affected voice transmission in the prior art).

Furthermore, the inventive bandwidth optimiser can be applied to those multi-bearer systems that allow choosing the bandwidth to allocate for each connection.

It is to be noted that, in spite of the wide literature existing about the performance of DECT system, a decision method has never been carried out, which allows the allocation of the bandwidth, taking into account the values of the bit error rate, together with traffic intensity.

Furthermore, said method is very different in delays than other known methods for the analysis of the performance of an application.

For instance, a similar analysis can be carried out also by means of simulators, but some disadvantages exist with them. In fact, the simulators are dependent on the application and are generally complex and slow. Moreover, with the use of the simulators a further analysis is often necessary to decide the bandwidth to allocate to each connection and so, with them, it is not possible to have an immediate result.

It is understood that other embodiments and/or modifications of the bandwidth optimiser, different from the one described, are possible, without leaving the scope of this invention. For example, in DECT a bearer is a carrier/time-slot combination. The invention is not limited to this notation. The key is the allocation of variable user bit rate (bandwidth) by a multiple access scheme. For a CDMA system, the different bearers are represented by different codes on the same or different carriers. Thus the invention applies to any notation of bearers for instance any combination of FDMA, CDMA and TDMA. Equivalent to change of the bandwidth by changing the number of bearers to one connection, is to change the slot length or to change the carrier bit rate.

What is claimed is:

1. A bandwidth optimizer, dynamically operating in connections relating to radio-communications for multi-bearer systems, especially for DECT systems for short-distance transfer of data packets, the optimizer comprising:
    - a first block to which a bit error rate (BER) is fed and which calculates a most likely number (k) of retransmissions, which is required by quality of an air interface;
    - a second block, which receives from the first block said number (k) of retransmissions and computes, on a basis of such number (k), a transmission time including delay for each of a number of bearers; and
    - a third block, which is fed by the second block and which decides an optimal number of bearers to be allocated to a connection and the output of which feeds a device for resources allocations, said optimal number of bearers representing a maximum band to allocate to the connection, depending also on traffic intensity.

2. A bandwidth optimizer as claimed in claim 1), wherein said first block takes bit error rate during each connection as a constant calculated in a previous connection.

3. A bandwidth optimizer as claimed in claim 1), wherein said first block calculates a most probable of retransmissions which are necessary for a correct transmission as a sum of a probability of error of N time slots when bit error rate changes.

4. A bandwidth optimizer as claimed in claim 1), wherein said second block calculates a time for transmitting a unit of service data plus a delay due to retransmissions, relating also to a number of bearers.

5. A bandwidth optimizer as claimed in claim 1), wherein said third block determines the optimal number of bearers to be allocated, taking into account the traffic intensity and therefore the delays, as well as the quality of the air interface.

* * * * *